United States Patent [19]
Marsanne et al.

[11] Patent Number: 6,112,259
[45] Date of Patent: *Aug. 29, 2000

[54] INTEGRATED CIRCUIT FOR DIRECT MEMORY ACCESS

[75] Inventors: Sébastien Marsanne, Grenoble; Francis Maquin, Fontaine, both of France

[73] Assignee: SGS-Thomson Microelectronics S.A., Gentilly, France

[*] Notice: This patent issued on a continued prosecution application filed under 37 CFR 1.53(d), and is subject to the twenty year patent term provisions of 35 U.S.C. 154(a)(2).

[21] Appl. No.: 08/732,619

[22] Filed: Oct. 16, 1996

[30] Foreign Application Priority Data

Oct. 19, 1995 [FR] France ................................ 95 12475

[51] Int. Cl.[7] ........................................................ G06F 13/28
[52] U.S. Cl. ............................................................ 710/22
[58] Field of Search ...................................... 395/842; 710/22

[56] References Cited

U.S. PATENT DOCUMENTS

| | | | |
|---|---|---|---|
| 4,908,772 | 3/1990 | Chi | 716/10 |
| 4,991,123 | 2/1991 | Casamassima | 340/825.08 |
| 5,276,836 | 1/1994 | Fukumaru | 711/138 |
| 5,430,853 | 7/1995 | Arakawa | 710/22 |
| 5,440,747 | 8/1995 | Kiuchi | 710/22 |
| 5,513,368 | 4/1996 | Garcia, Jr. et al. | 710/22 |
| 5,598,579 | 1/1997 | Welker et al. | 710/22 |
| 5,642,489 | 6/1997 | Bland et al. | 710/22 |
| 5,717,952 | 2/1998 | Christiansen et al. | 710/22 |

OTHER PUBLICATIONS

French Search Report from French patent application No. 95 12475.
Circuit to Provide Asynchronous Access to a Common Register Set; IBM Tech. Disc. Bulletin, vol. 36, No. 10, Oct. 1993, Armonk, New York, pp. 47–48.
Scalable I/O Architecture for Buses; David V. James; IEEE Computer Soc. Jun. 26, 1989 pp. 539–544 Compcon Spring '89 Digest of Papers.
A 16–bit Microcomputer µPD70423for Serial Communication; Kanai et al., UDC Nes res. & Develop. vol. 32, No. 3, Jul. 1991, pp. 350–360.
Circuit to Provide Asynchronous Access to a Common Register Set; IBM Tech. Disc. Bulletin, vol. 32, No. 6a, Nov., 1989, Armonk, New York, pp. 47–48.

Primary Examiner—Mark R. Powell
Assistant Examiner—Jeffrey Allen Rossi
Attorney, Agent, or Firm—Wolf, Greenfield & Sacks P.C.; James H. Morris; Theodore E. Galanthay

[57] ABSTRACT

A device that can be integrated into an integrated circuit dedicated to a microprocessor, this circuit comprising a direct memory access circuit and a communications cell, the communications cell comprising a state register and a sequencer that contain first information elements, the direct memory access circuit comprising a control register that contains second information elements, wherein said device comprises action means to enable the communications cell to act directly on bits of the control register in order to make certain of the second information elements identical to certain of the first information elements. Also disclosed is a method designed to eliminate possible conflicts between a direct memory access circuit and a communications cell that are due to information elements of the same nature.

33 Claims, 1 Drawing Sheet

INTEGRATED CIRCUIT FOR DIRECT MEMORY ACCESS

BACKGROUND OF THE INVENTION

1. Field of the Invention

An object of the present invention is an improved integrated circuit for direct memory access to be interposed between a microprocessor and a communications cell. This invention can be used in the transfer of data between a memory and a peripheral.

2. Discussion of the Related Art

Direct memory access circuits are used to replace a microprocessor during data transfers between the memory of said microprocessor and a peripheral. This circuit can be used to free the microprocessor from the transferring task or to make up for any delay by the microprocessor during a transfer. The use of a direct memory access circuit is done commonly with mass memory type peripherals or communications port type peripherals. A direct memory access circuit receives instructions from a microprocessor. The instructions correspond to an indication of the start-of-transfer address, the direction of the transfer, the validation of the use of an interruption, the values of incrementation of the addresses, the suspension of operation, etc.

During a transfer of data with a peripheral, the microprocessor sends its instructions to the direct memory access circuit and then sends its instructions to the peripheral and the transfer takes place as follows:

- the peripheral sends a signal requesting the transfer of one or more data elements to the direct memory access circuit;
- the direct memory access circuit informs the microprocessor that the direct memory access circuit controls the control bus, the address bus and the data bus of the system,
- the data element or elements are transferred between the peripheral and the memory under the control of the direct access memory,
- the control of the buses is released by the direct memory access circuit.

Since the peripherals are generally slower than the memory, the use of a direct memory access circuit prevents the microprocessor from having to save its internal registers in order to see to the transfer with the peripheral. This takes a certain amount of time and consequently spares the peripheral from having to wait for the transfer. All the transfer operations take place without any problem if the direction of transfer of the peripheral and of the direct memory access circuit are compatible. If the peripheral is a communications cell that interfaces information transfers with the exterior of the system, this amounts to saying that a reception of data, coming from the exterior of the system, corresponds, for the communications cell, to an operation of writing in the memory for the direct memory access circuit and that a transmission of data towards the exterior of the system corresponds, for the communications cell, to an operation of reading in the memory for the direct memory access circuit.

Should the peripheral be a communications cell, its role is to interpose itself between the buses of the microprocessor and a communications network. The communications cell takes responsibility, firstly, for the different impedance and power matching operations needed for the efficient operation of the communications network. Secondly, it will manage the data exchange protocol of the communications network.

Now, in certain data transfer protocols, for example the so-called DDC protocol, the communications cell may act in the so-called "master" and "slave" modes. The "master" mode means that the communications cell will direct the communications network. The "slave" mode means that the communications cell will be directed by the communications network. During operation in "slave" mode, the communications cell will have to carry out data transfers whose direction is dictated by the communications network. If the memory access and the cell do not have compatible directions of transfer, a conflict will occur on the data bus: either no information is present or two information elements are present. While such conflicts are not destructive (the circuits are protected against brief short-circuits), the problem of the loss of information is quite real.

A first approach to this problem is a software approach. It consists in making the interface peripheral send an interruption message to the microprocessor so that the cell is managed by this microprocessor until the direction of transfer has been defined so as to transmit the direction of transfer to the direct memory access circuit. This kind of approach entails a substantial loss of time for the microprocessor and if it is busy with a task where a lot of time is needed before it can be released from this task, then a possible loss of data may occur if the information on direction of transfer is not transmitted with sufficient speed to the direct memory access circuit. Furthermore, the problem continues to be present, for the use of the direct memory access further slows down the microprocessor.

The invention is aimed at resolving the above-defined problem. According to the invention, links are added between a control register of the direct memory access circuit and the communications cell. By enabling an updating of the control register of the direct memory access circuit controlled by the communications cell, all the conflicts due to the direction of transfer are avoided and the microprocessor is unloaded.

SUMMARY OF THE INVENTION

An object of the invention therefore is a circuit comprising a microprocessor, a memory, a direct memory access circuit and a communications cell, the communications cell comprising a state register and a sequencer in which there are contained first information elements, the direct memory access circuit comprising a control register in which there are memorized second information elements, wherein the circuit comprises action means connected to the communications cell and to the direct memory access circuit to enable the communications cell to act directly on bits of the control register in order to make some of the second information elements identical to some of the first information elements.

A circuit of this kind can be used to eliminate conflicts that might be due to information elements of the same type that do not have the same values. The problem is resolved in one case by replacing the two information elements present in the direct memory access circuit and the communications cell by one and the same information elements. In another case, it is resolved by enforcing the state of one of the information elements as a function of the other. The invention also consists of a method using such a circuit.

An embodiment of the invention is directed to a data transfer circuit comprising a microprocessor having a memory; a direct memory access circuit coupled to the microprocessor by a bus, the direct memory access circuit including a control register; a communication cell coupled to the microprocessor and the direct memory access circuit by the bus, and to a communication network; and means for controlling a first control bit and a second control bit, each stored in the control register. When the first control bit is at a first level, the direct memory access circuit writes data to the memory. When the first control bit is at a second level, the direct memory access circuit reads data from the memory, and when the second control bit is at the first level, the direct memory access circuit operates. When the second control bit is at the second level, operation of the direct memory access circuit is suspended. The communication cell may comprise a sequencer which accepts a signal from the communication network, the signal indicating whether the data transfer circuit is to operate in a transmission mode or a reception mode. The control means may comprise a logic circuit which reads the signal from the sequencer, decodes the signal, outputs a first state bit at a first level when the data transfer circuit is to operate in a transmission mode and at a second level when the data transfer circuit is to operate in a reception mode, and forces the first control bit to the level of the first state bit. In this way, the direct memory access circuit will read information from the memory when the data transfer circuit is operating in the transmission mode, and the direct memory access circuit will write information to the memory when the data transfer circuit is operating in the reception mode. The communication cell may comprise a state register including a second state bit which is set by the microprocessor, which suspends operation of the communication cell, wherein the control means drives the second control bit to the level of the second state bit, thereby allowing both the communication cell and the direct memory access circuit to operate when the second state bit is set to the first level, and suspending operation of both the communication cell and the direct memory access circuit when the second state bit is set to the second level.

Another embodiment of the invention is directed to a data transfer circuit comprising a microprocessor having a memory, a direct memory access circuit and a communication cell coupled to each other by a bus, wherein the communication cell drives first and second control elements of the direct memory access circuit to be identical to first and second state elements of the communication cell. The communication cell may comprise a logic circuit which forces the first control element to a level of the first state element and a state register which forces the second control element to a level of the second state element. The first state element may indicate whether the data transfer circuit operates in a transmission mode or a reception mode, and the first control element may determine whether the direct memory access circuit reads data from the memory or writes data to the memory. In this way, when the data transfer circuit operates in the transmission mode, the direct memory access circuit reads data from the memory, and when the data transfer circuit operates in the reception mode, the direct memory access circuit writes data to the memory. The second state element may determine whether operation of the communication cell is suspended, and the second control element may determine whether operation of the direct memory access circuit is suspended such that when operation of the communication cell is suspended, operation of the direct memory access circuit is suspended.

Another embodiment of the invention is directed to a method of controlling a direct memory access circuit of a data transfer device, the method comprising: (a) receiving a signal from a communication network; (b) decoding the signal to determine if the data transfer device is to transmit data or receive data; (c) instructing the direct memory access circuit to operate based upon the signal decoded in step (b); (d) receiving a suspension signal; and (e) instructing the direct memory access circuit to operate based upon the suspension signal. Step (c) may comprise instructing the direct memory access circuit to read data if the signal decoded in step (b) indicates that the data transfer device is to transmit data; and instructing the direct memory access circuit to write data if the signal decoded in step (b) indicates that the data transfer device is to receive data. Step (e) may comprise suspending operation of the direct memory access circuit if the suspension signal indicates that a suspension of operation is necessary.

BRIEF DESCRIPTION OF THE DRAWING

Other features and advantages of the invention shall appear from the following description made with reference to the appended drawing, given purely by way of an example.

DETAILED DESCRIPTION

Figure 1:
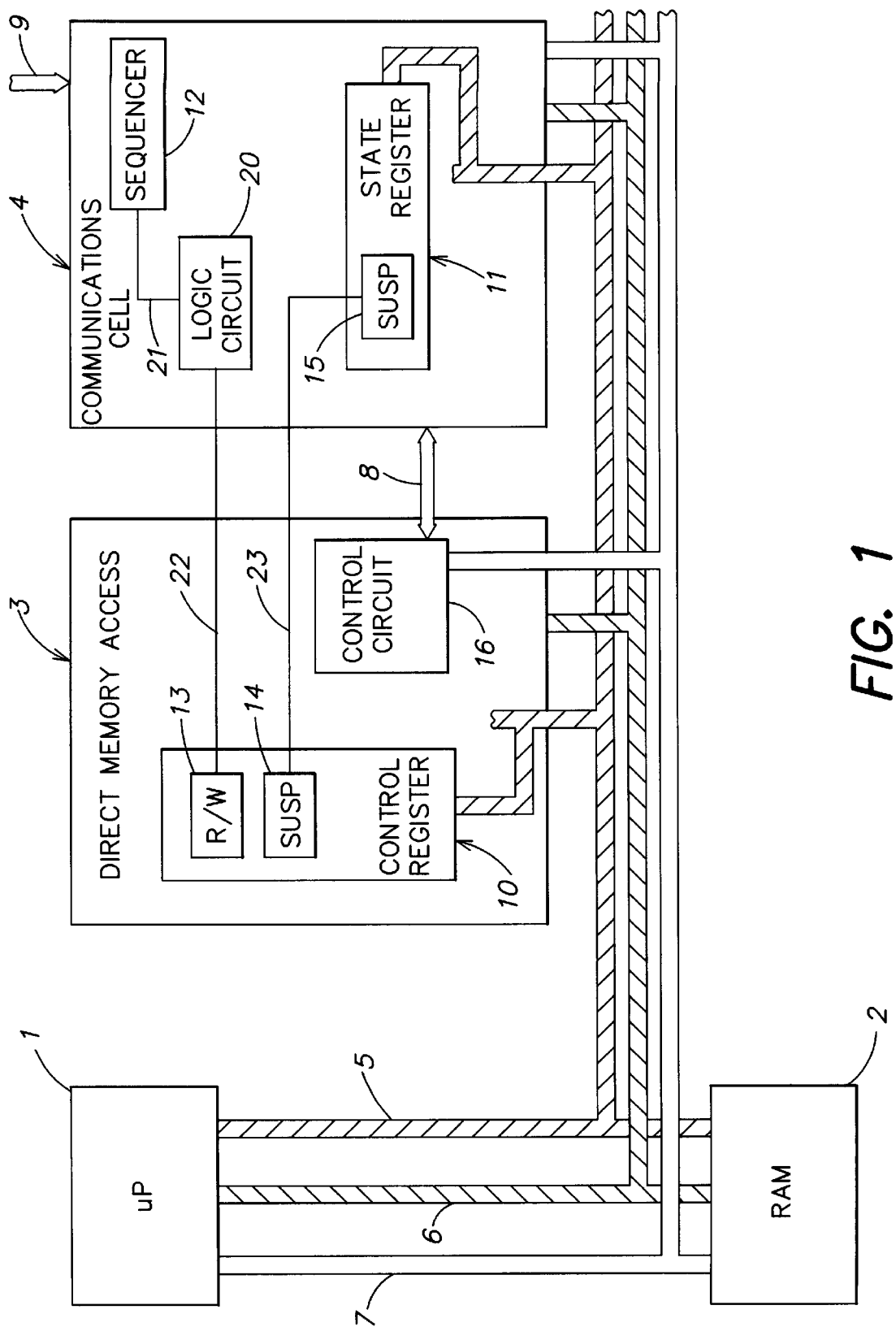
FIG. 1 shows a drawing using a direct access memory circuit with a communications cell, for example supporting the DDC protocol according to the invention.

The diagram of FIG. 1 shows, according to the invention, a microprocessor 1 with a part of its environment. The figure shows a memory 2 dedicated to this microprocessor 1, a direct access memory circuit 3 to access this memory 2 and a communications cell 4, for example of the DDC type. These four elements 1 to 4 are connected to one another by a data bus 5, an address bus 6 and a command bus 7. The three buses are shown herein as being differentiated but it is quite possible to conceive of a configuration where there is only one bus that includes all three buses. A special link is furthermore set up between the cell 4 and the direct memory access circuit 3 by means of an interface bus 8. The bus 8 is designed to convey requests for transfer coming from the cell 4 and synchronization signals that are necessary during the transfers of data between the cell 4 and the memory performed under the control of the direct memory access circuit. A communications cell comprises, by virtue of its principle, data matching circuits and circuits matched firstly with the protocol of a communications network 9 and secondly with the protocol proper to the microprocessor 1, namely to the buses 5, 6 and 7. A direct memory access circuit is an element well known to those skilled in the art, and many technical documents describe its working.

The direct memory access circuit 3 comprises, inter alia, a control register 10 and a control circuit 16. The cell 4 has a state register 11 and a sequencer 12.

The control register 10 is connected to the data bus 5 when this control register 10 is addressed by the microprocessor 1. The microprocessor 1 may then read or write in this control register 10. The control register 10 enables the storage of the information elements proper to the working of the direct memory access circuit. The control register 10 is formed by flip-flop circuits and all the outputs of the flip-flop circuits are connected to the control circuit 16 (not shown in FIG. 1). For the present example, two control bits 13 and 14 of this register are of special interest. The first control bit 13 represents a read/write information element. The second control bit 14 represents a suspended activity information element.

The control circuit 16 is connected to the control bus 7, the interface bus 8, the output of all the flip-flop circuits of the control register (not shown in FIG. 1), and many other elements of the direct memory access circuit. The role of this control circuit is to synchronize the working of the direct memory access circuit in taking account of information elements internal to the direct memory access circuit and in taking account of information coming from the exterior (through the buses 7 and 8). This control circuit will also produce synchronization signals on the buses 7 and 8 during a transfer of data elements between the cell 4 and the memory 2.

The state register 11 is connected to the data bus 5 when this state register 11 is addressed by the microprocessor. The microprocessor 1 may then read or write in this state register 11. For the present example, a state bit 15 contains a suspended activity information element proper to the cell 4.

The sequencer 12 manages the different states of communication required by the protocol, for example the DDC protocol, used by the communications network 9. It is consequently capable of knowing, through its state, whether the cell 4 is working in transmitter mode or in receiver mode.

One particular feature of certain protocols, DDC among others, is that the cell 4 may be a master or a slave. Should the cell 4 be a master, it is microprocessor 1 that will inform the cell 4 of the direction in which the transmission has to be made, and the microprocessor 1 may inform the direct memory access circuit 3 of the direction in which the transfer will be made with the memory 2. The microprocessor 1 is then free for the rest of the transmission. Should the cell 4 work as a slave, the direction of this transmission will be given by the communications network 9. In the prior art, the cell 4 would then have to send an interruption message to the microprocessor 1 which would position the direct memory access circuit 3 in the right direction of transfer. The microprocessor 1 is therefore disturbed by the transmission in order to prevent the loss of data due to a conflict between the direct memory access circuit 3 and the cell 4.

In order to eliminate this problem, enforcing means have been added. These enforcing means comprise a logic circuit 20, a state bus 21 and a enforcing wire 22. The logic circuit 20 is connected to the sequencer 12 by the state bus 21 and the control register 10 by means of the enforcing wire 22.

In the present example, the sequencer 12 has its states encoded on four bits, the state bus 21 will comprise four wires in order to enable the logic circuit 20 to decode the states corresponding to the transmission or reception of data elements. In the present example, the transmission states make the logic circuit 20 produce a logic 1 on the enforcing wire 22. The control register 10 is modified with respect to the prior art. The first control bit 13 is contained in a flip-flop circuit that will be capable of being enforced independently of the other flip-flop circuits of the control register 10. A D type flip-flop circuit of the register is replaced by another D type flip-flop circuit which is provided with an asynchronous input for setting at 1 called a "Set" input and an asynchronous input for setting at 0 called a "Reset" input. These two asynchronous inputs will be connected to each other by an inverter. The "Set" input for example is considered to be the enforcing input of the flip-flop circuit. The enforcing wire 22 controls the enforcing input of the flip-flop which contains this first control bit 13. A logic one brings about the correspondence of a high level for the first control bit 13. This corresponds to a reading of the memory during the intervention of the direct memory access circuit 3. A logic zero on the enforcing wire 22 corresponds to a memory writing operation. Those skilled in the art will notice that the microprocessor no longer has the possibility of writing in the enforced flip-flop circuit for this flip-flop circuit is constantly enforced either at 0 or at 1.

A device of this kind enables the enforcing of the flip-flop circuits of the control register 10 as a function of certain information elements contained in the cell 4 and therefore enables the performance of transfers of data in the memory when the cell 4 works in slave mode without any intervention by the microprocessor 1. When the transfer is requested by the communications network, the logic circuit 20 will decode the states of the sequencer 12 in order to ascertain that it is a transmission or a reception of data elements and will automatically position the bit 13 in a state compatible with the transmission. The rest of the transfer will be done as in the prior art.

The second control bit 14 contains a suspended operation information element that is also present in the state register 11 as state bit 15. The microprocessor 1 must therefore suspend both the direct memory access circuit 3 and the cell 4. This brings about the performance of two operations for a common result.

A coordination wire 23 connects the registers 10 and 11 in the invention. This wire 23, in one example, is connected to the output of the flip-flop circuit containing the state bit 15 and the output of the flip-flop circuit containing the second control bit 14. Since the flip-flop circuit containing the state bit 15 and the flip-flop circuit containing the second control bit 14 are short-circuited with each other, it is possible to eliminate one of them, for example the flip-flop circuit containing the second control bit 14. In short, the wire 23 can be used to make it seem as if the second control bit 14 is in the control register 10 during a reading of this register 10 whereas in fact this control bit 14 is the same as the state bit 15 which is present in the register 11. However, the writing of this state bit 15 can be done only in the state register 11.

A method of this kind simplifies the task of the microprocessor 1 which henceforth has only one operation to carry out an order to suspend the working of the device.

Furthermore, in the case of a transmission error detected by the cell 4, this cell 4 through a means for enforcing the register 15 automatically suspends its operation, and suspends the operation of the memory access 3 at the same time.

The two methods for the exchange of information, enforcing a flip-flop circuit or substituting for a flip-flop circuit, are equivalent in their results, although the form is different. For the case of the first operating bit 13 corresponding to the read/write information, rather than enforcing a flip-flop of the register 10, it is possible to replace it with one end of the enforcing wire 22. The logic circuit 20 will then simulate a flip-flop circuit of the control register 10. Similarly, it is possible to use a flip-flop circuit enforcing operation for the second control bit 14. It is enough to use the coordination wire 23 to send a signal that will enforce the flip-flop circuit that contains the second control bit 14 at the state corresponding to the suspension of the operation of the memory access in the case of a detected error.

If the method chosen is to enforce the flip-flop circuits, it is possible to retain a possibility of modifying the register 10 by means of the microprocessor 1. This is the case when the enforcement appears necessary only for one state. In the case of the suspension of transfer for example, it is highly desirable that the suspension should be done without the intervention of the microprocessor 1. However, the reactivation of the device in any case requires the intervention of the microprocessor 1 and the fact of having two registers 10 and 11 to be addressed may be seen as a loss of time used as a safety redundancy system. To enable the enforcement of a flip-flop circuit at only one level "0" or "1", it is enough to use only one resetting or setting asynchronous input.

Having thus described at least on illustrative embodiment of the invention, various alteration, modifications and improvements will readily occur to those skilled in the art. Such alterations, modifications, and improvements are intended to be within the sprirt and scope of the invention. Accordingly, the foregoing description is by way of example only and is not intended as limiting. The invention is limited only as defined in the following claims and the equivalents thereto.

What is claimed:

1. A circuit comprising a microprocessor, a memory, a direct memory access circuit and a communications cell coupled together by a bus, the communications cell comprising a state register and a sequencer in which there are contained first information elements that define at least a first state of the communication cell, the direct memory access circuit comprising a control register in which there are stored second information elements defining at least a second state of the direct memory access circuit, wherein said circuit comprises action means connected to the communications cell and directly connected to the control register to enable the communications cell to act directly on certain of the second information elements of the control register, independently of acting on other information elements of the control register, in order to make the second state of the direct memory access circuit identical to the first state of the communication cell.

2. The circuit according to claim 1, wherein the action means comprise enforcing means that enforce flip-flop circuits of the control register as a function of values of the first information elements contained in the communications cell.

3. The circuit according to claim 1, wherein the action means comprise means of substitution that provides the control register with certain of the first information elements in place of certain of the second information elements.

4. The circuit according to claim 1 wherein the direct memory access circuit and the communications cell are integrated into one semiconductor substrate.

5. The circuit according to claim 2, wherein the direct memory access circuit and the communications cell are integrated into one semiconductor substrate.

6. The circuit according to claim 3, wherein the direct memory access circuit and the communications cell are integrated into one semiconductor substrate.

7. A method for the use of a circuit comprising a microprocessor, a memory, a direct memory access circuit and a communications cell coupled together by a bus, the communications cell comprising a state register and a sequencer in which first information elements that define at least a first state of the communication cell are contained, the direct memory access circuit comprising a control register that contains second information elements defining at least a second state of the direct memory access circuit, wherein the communications cell produces signals on electrical links which are directly connected to certain of the second information elements of the control register in order to make the second state of the direct memory access circuit identical to the first state of the communication cell, independently of acting on other information elements of the control register.

8. The method according to claim 7, wherein one of the first and second information elements represent a direction of transfer of information from the memory.

9. The method according to claim 7, wherein one of the first and second information elements represent a suspension of activity of said direct memory access circuit.

10. A data transfer circuit comprising:
a microprocessor having a memory;
a direct memory access circuit, coupled to said microprocessor by a bus, said direct memory access circuit including a control register, the control register having a first control bit and a second control bit, the first and second control bits defining at least a first state of the direct memory access circuit;
a communication cell coupled to said microprocessor and said direct memory access circuit by said bus, and to a communication network; and
means for controlling the first control bit and the second control bit independently of acting on other bits of the control register;
wherein the means for controlling comprises first and second direct electrical links between the first and second control bits, respectively, and the communication cell.

11. The data transfer circuit of claim 10, wherein when said first control bit is at a first level, said direct memory access circuit writes data to said memory, and when said first control bit is at a second level, said direct memory access circuit reads data from said memory.

12. The data transfer circuit of claim 10, wherein when said second control bit is at a first level, the direct memory access circuit operates, and when said second control bit is at a second level, operation of the direct memory access circuit is suspended.

13. The data transfer circuit of claim 10, wherein when said first control bit is at a first level, said direct memory access circuit writes data to said memory, and when said first control bit is at a second level, said direct memory access circuit reads data from said memory; and
when said second control bit is at said first level, the direct memory access circuit operates, and when the second control bit is at said second level, operation of said direct memory access circuit is suspended.

14. The data transfer circuit of claim 11, wherein said communication cell comprises a sequencer which accepts a signal from said communication network, said signal indicating whether said data transfer circuit is to operate in a transmission mode or a reception mode.

15. The data circuit of claim 14, wherein said control means further comprises a logic circuit which reads said signal from said sequencer, decodes said signal, outputs a first state bit at a first level when said data transfer circuit is to operate in a transmission mode and at a second level when said data transfer circuit is to operate in a reception mode, and forces said first control bit to the level of said first state bit, such that said direct memory access circuit will read information from said memory when said data transfer circuit is operating in said transmission mode, and said direct memory access circuit will write information to said memory when said data transfer circuit is operating in said reception mode.

16. The data transfer circuit of claim 12, wherein said communication cell comprises a state register including a second state bit which is set by said microprocessor, which suspends operation of the communication cell, wherein said control means drives said second control bit to the level of the second state bit, thereby allowing both said communication cell and said direct memory access circuit to operate when said second state bit is set to said first level, and suspending operation of both said communication cell and said direct memory access circuit when said second state bit is set to said second level.

17. The data transfer circuit of claim 13, wherein said communication cell further comprises a sequencer which accepts a signal from said communication network, said signal indicating whether said data transfer circuit is to operate in a transmission mode or a reception mode.

18. The data circuit of claim 17, wherein said control means comprises a logic circuit which reads said signal from said sequencer, decodes said signal, outputs a first state bit at a first level when said data transfer circuit is to operate in a transmission mode and at a second level when said data transfer circuit is to operate in a reception mode, and forces said first control bit to the level of said first state bit, such that said direct memory access circuit will read information from said memory when said data transfer circuit is operating in said transmission mode, and such that said direct memory access circuit will write information to said memory when said data transfer circuit is operating in said reception state.

19. The data transfer circuit of claim 18, wherein said communication cell comprises a state register including a second state bit which is set by said microprocessor, which suspends operation of the communication cell, wherein said control means drives said second control bit to the level of the second state bit, thereby allowing both said communication cell and said direct memory access circuit to operate when said second state bit is set to said first level, and suspending operation of both said communication cell and said direct memory access circuit when said second state bit is set to said second level.

20. A data transfer circuit comprising a microprocessor having a memory, a direct memory access circuit and a communication cell coupled to each other by a bus, the direct memory access circuit including first and second control elements defining at least a first state of the direct memory access circuit, wherein the data transfer circuit further comprises first and second direct electrical links between the first and second control elements, respectively, and the communication cell, and said communication cell directly controls the first and second control elements, independently of acting on other elements of the control register, to be identical to first and second state elements of said communication cell by providing a first and second signal, respectively, on the first and second direct electrical links.

21. The data transfer circuit of claim 20, wherein said communication cell comprises a logic circuit which forces said first control element to a level of said first state element.

22. The data transfer circuit of claim 20, wherein said communication cell comprises a state register which forces said second control element to a level of said second state element.

23. The data transfer circuit of claim 21, wherein said communication cell further comprises a state register which forces said second control element to a level of said second state element.

24. The data transfer circuit of claim 21, wherein said first state element indicates whether said data transfer circuit operates in a transmission mode or a reception mode, and said first control element determines whether said direct memory access circuit reads data from said memory or writes data to said memory such that when said data transfer circuit operates in said transmission mode, said direct memory access circuit reads data from said memory, and when said data transfer circuit operates in said reception mode, said direct memory access circuit writes data to said memory.

25. The data transfer circuit of claim 22, wherein said second state element determines whether operation of said communication cell is suspended, and said second control element determines whether operation of said direct memory access circuit is suspended such that when operation of said communication cell is suspended, operation of said direct memory access circuit is suspended.

26. The data transfer circuit of claim 23, wherein said first state element indicates whether said data transfer circuit operates in a transmission mode or a reception mode, and said first control element determines whether said direct memory access circuit reads data from said memory or writes data to said memory such that when said data transfer circuit operates in said transmission mode, said direct memory access circuit reads data from said memory, and when said data transfer circuit operates in said reception mode, said direct memory access circuit writes data to said memory.

27. The data transfer circuit of claim 26, wherein said second state element determines whether operation of said communication cell is suspended, and said second control element determines whether operation of said direct memory access circuit is suspended such that when operation of said communication cell is suspended, operation of said direct memory access circuit is suspended.

28. A method of controlling a direct memory access circuit of a data transfer device, the direct memory access circuit including a control register having first and second control bits defining at least a first state of the direct memory access circuit, and the data transfer device including a communication cell coupled to the direct memory access circuit by a bus and directly connected to at least the first or second control bit by a direct electrical link, wherein the communication cell:

(a) receives a signal from a communication network;
(b) decodes said signal to determine if said data transfer device is to transmit data or receive data;
(c) instructs said direct memory access circuit to operate based upon said signal decoded in step (b);
(d) receives a suspension signal; and
(e) instructs said direct memory access circuit to operate based upon said suspension signal;

wherein step (c) or step (e) produces a signal on the direct electrical link, bypassing use of the bus, thereby directly controlling at least the first state of the direct memory access circuit independently of acting on other bits of the control register.

29. The method of claim 28, wherein step (c) comprises:
instructing said direct memory access circuit to read data if said signal decoded in step (b) indicates that said data transfer device is to transmit data; and
instructing said direct memory access circuit to write data if said signal decoded in step (b) indicates that said data transfer device is to receive data.

30. The method of claim 28, wherein step (e) comprises suspending operation of said direct memory access circuit if said suspension signal indicates that a suspension of operation is necessary.

31. The method of claim 28, wherein the communication cell is directly connected to the certain control bits by first and second direct electrical links, and step (c) and step (e) produce signals on the first and second direct electrical links, respectively, bypassing use of the bus, thereby directly controlling the direct memory access circuit.

32. The method of claim 31, wherein step (c) comprises:
instructing said direct memory access circuit to read data if said signal decoded in step (b) indicates that said data transfer device is to transmit data; and
instructing said direct memory access circuit to write data if said signal decoded in step (b) indicates that said data transfer device is to receive data.

33. The method of claim 31, wherein step (e) comprises suspending operation of said direct memory access circuit if said suspension signal indicates that a suspension of operation is necessary.

* * * * *